June 29, 1965  J. A. POLON  3,192,290
METHOD FOR PRODUCING ROUNDED CLAY GRANULES
Filed Aug. 6, 1962
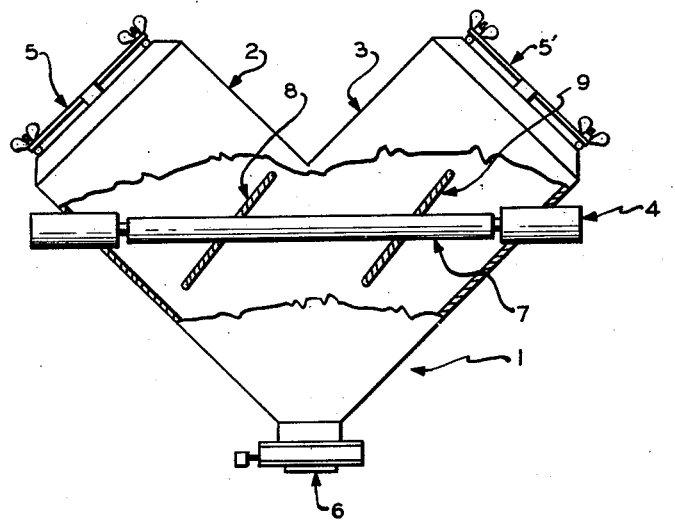
INVENTOR.
JAMES A. POLON
BY
ATTORNEY

United States Patent Office

3,192,290
Patented June 29, 1965

3,192,290
METHOD FOR PRODUCING ROUNDED
CLAY GRANULES
James A. Polon, East Brunswick, N.J., assignor to Minerals & Chemicals Philipp Corporation, Menlo Park, N.J., a corporation of Maryland
Filed Aug. 6, 1962, Ser. No. 215,027
17 Claims. (Cl. 264—15)

This invention relates to a novel process for compacting clay or mixtures of clay and other ingredients into small uniformly sized hard particles of substantially spherical shape.

Clays intended for use as adsorptive contact masses, carriers for active agricultural ingredients such as herbicides and insecticides, or carriers for catalytic material, are marketed in the form of small hard granules. The granules are supplied as screened materials containing particles within restricted mesh sizes, such as, for example, 20/40 mesh granules, 30/60 mesh granules or the like.

The granules are usually produced commercially by plasticizing the raw clay with water, extruding the mixture, drying and/or calcining the extrudate and then crushing and sizing. For some applications herbicides, insecticides, zeolitic particles or other insoluble powdered solids are incorporated into the clay that is fed to the extruder so that the finished granules are composed of a mixture of clay with other ingredients. While the crushing can be controlled to some extent to assure a maximum yield of particles of the desired mesh size with a minimum production of by-product fines, in practice large quantities of virtually useless fines are produced. As a result, the economics of the granulating process is adversely effected. Moreover, granules obtained by crushing extruded clay are irregular in shape. Consequently, the flow and percolation properties of the granules are poor as compared with the flow and percolation properties of round particles of the same size. Furthermore, dust produced during crushing adheres to the granules and is not removed from the granules by commercial screening operations. The adherent dust creates problems when the granules are handled and used.

Another approach to granulating clay particles or mixture of clay with other powdered solids entails agglomerating finely divided particles of the ingredient or ingredients into coherent granules by tumbling the powdered particles, as in a cylindrical drum or a pan granulator, while spraying the particles with liquid droplets. While some solids can be granulated in this manner, this procedure is very ineffective with other solids, such as, for example, attapulgite clay and bauxite. Granules of attapulgite clay or bauxite obtained in this manner are very soft and unsuitable for most of the principal uses of these minerals. Furthermore, the granules are irregular in shape and frequently vary widely in size.

Accordingly, an object of this invention is the provision of an improved method for granulating clay fines and mixtures containing clay fines.

A more particular object is the provision of a simple method for producing small hard spheres containing clay.

Still another object of this invention is the provision of an improved method or granulating solid powders by a combined tumbling and localized intensive working action.

Another important object of this invention is the provision of a method for granulating powdered solids wherein substantially spherical granules of exceptionally uniform particle size distribution are obtained.

This invention results from the discovery that small hard uniformly sized spherical granules that are substantially free from dust can be produced by moistening colloidal clay particles, or a finely divided mixture including particles of colloidal clay, to a controlled consistency with water and subjecting the moistened material to an intercepted tumbling action hereinafter described.

This invention will be more fully understood by reference to the following description, taken with the accompanying figure, which represents diagrammatically a side elevational view, partially in section, of an apparatus suitable for carrying out the process.

Stated briefly, in accordance with this invention, finely divided clay containing colloidal particles is compacted into hard uniformly sized substantially spherical granules by a process in which the clay is initially moistened with a quantity of water or aqueous liquid so controlled that the clay particles draw together into a multiplicity of small discrete hand-friable aggregates having free-flowing properties, the quantity of water being insufficient to plasticize the clay. The clay thus moistened is continuously tumbled in a rotating vessel simultaneously while intercepting at least a major part of the tumbled clay particles (and, preferably, substantially all of the particles) during their downflow against the faces of at least one smooth surfaced disc that is free from peripheral protuberances, such as blades, and rotates in a plane oblique to the axis of rotation of the disc at a speed such that impinging particles are ejected outwardly off said disc, whereby the moistened clay particles while tumbling are subjected to intensive localized shearing action and accumulate into a multiplicity of small uniformly sized masses of substantially spherical form which gradually increase in size as the disc-intercepted tumbling is continued. The moistened clay is tumbled and intercepted by the rotating oblique disc or discs until all of the moistened clay is in the form of substantially spherical compacted masses of the desired particle size, the compacted masses being appreciably harder than the aggregates obtained by merely moistening the charge clay. The compacted spherical masses are then dried to harden them further.

The granules obtained in this manner are free from dust and are characterized by being of unusually uniform size distribution, i.e., the granular product is substantially free from undersized or oversized particles.

Moistening can be carried out simultaneously with tumbling, if desired, preferably by ejecting water as a fog in the form of a radial band adjacent the rotating discs in a manner such that the fog is completely absorbed by the clay particles before the fog impinges the walls of the vessel.

In accordance with a form of this invention, powdered particles of water-insoluble solids, such as, for example, zeolites (e.g., molecular sieves or their precursors), herbicides, insecticides, trace fertilzier elements, are granulated with a clay binder by simple modification of the procedure described above in which the finely divided clay containing colloidal particles is dry mixed in suitable proportion with powdered particles of the solid to be granulated before the clay is moistened to a consistency described above and then tumbled while intercepting the tumbled particles against the face of a rotating oblique disc.

From this brief description of the process of the subject invention it may be seen that an essential feature of the process is the initial controlled moistening of the colloidal clay or mixture containing colloidal clay binder. Another essential feature is that most of the tumbled clay or mixture containing clay is intercepted during its downflow by at least one high speed disc rotating in a plane oblique to the axis of rotation of the disc.

Any clay material or mixtures of clay material containing colloidally dimensioned clay particles can be used in carrying out this invention. Especially good results have been obtained with a type of clay mined in the southeast part of the United States and referred to as "attapulgite clay." However, other clays such as bentonites, kaolins, illite and sepiolite can be used. Bauxite is an earthy material having physical properties similar to clays and, therefore, for purposes of this invention bauxitic clay is considered to be a clay material within the scope of this invention. The clay material can be raw clay, degritted raw clay, dried clay or even some calcined clays. However, it is of the essence that the clay contain some colloidally dimensioned clay particles, i.e., particles ½ micron or smaller. The presence of such particles in a clay sample can be determined by electron microscope. In many cases the presence of colloidal particles can be readily determined by observing the rheological properties of aqueous slurries of the clay being investigated and applying criteria well known to those skilled in the art. The starting clay is in the form of a powder, that is, the particles are substantially all finer than 60 mesh (Tyler) and, preferably, are finer than 100 mesh.

In putting the invention into practice, the water can be premixed with clay (and other ingredients) in a pug mill or, as mentioned, may be mixed with the solids in the tumbling unit, as by liquid spray or fog means. In many instances aqueous solutions will be used. For example, aqueous alkali solutions can be employed to improve further the hardness of certain types of clay granules. Likewise water-soluble active materials such as soluble fertilizers, insecticides, herbicides or precursors of active catalytic ingredients such as metallic salts can be dissolved in the water. Auxiliary granular binders such as water-dispersible gums and resins can be employed, if desired.

The quantity of water added to the finely divided solids will vary considerably with the clay species employed and with the nature and quantity of nonclay material present. A highly absorptive clay such as attapulgite will require more water to obtain a mixture of substantially the same consistency as kaolin clay or a sodium bentonite clay. On the other hand, more water will be required with a calcium bentonite than with a sodium bentonite. In the case of attapulgite clay or mixtures including attapulgite clay, water is added to bring the free moisture content (F.M.) of the clay to an amount within the range of about 30% to 50%. At an F.M. less than 30%, the clay cannot be compacted as effectively as attapulgite clay having a higher F.M. At an F.M. in excess of 50%, the clay is too moist and tacky for effective granulation by the method of this invention. The term "free moisture" or F.M. as used herein refers to the weight percentage of a material which is eliminated by heating the material to essentially constant weight at 220° F. In the case of clay per se, water accounts for substantially all of the free moisture.

A suitable quantity of water addition can be determined by simple experiment involving observing the change of consistency of the clay material (or mixture containing clay) upon addition of various quantities of water. When insufficient water has been incorporated, the clay particles appear virtually unchanged from the starting clay. Upon further addition of water to a satisfactory level, the clay mass shrinks perceptibly and the particles draw together or agglomerate into small discrete particles which can be readily broken up or pulverized by rubbing between the fingers. Upon addition of a small excess of water to masses of the proper consistency, small discrete plastic particles are obtained. The discrete plastic particles cannot be readily hand pulverized. With a greater excess of water, e.g., an F.M. of 60% in the case of attapulgite, a coherent plastic mass is formed. Employing such plastic particles or a coherent plastic mass, the desired results will not be obtained.

When the clay, or mixture containing clay, is premoistened, as in a pug mill, the granulation of the premoistened feed can be carried out by the apparatus shown in the accompanying figure which is a simple modification of the twin shell blender described in U.S. Patent No. 2,677,534. As shown in the figure, the basic tumbler blender unit 1 is formed from a cylinder cut at an angle and joined together to form a V shape with cylindrical legs 2 and 3. The tumbler blender unit 1 is mounted for rotation (by means not shown) about a horizontal shaft 4 that provides equal torque loading and is provided with removable openings 5 and $5^1$ in legs 2 and 3, respectively, for charging feed material and another removable opening 6 at the base formed by legs 2 and 3 for emptying the vessel. An intensifier bar 7 is horizontally mounted for rotation within the unit 1 by suitable means (not shown).

Two canted discs 8 and 9 are fixedly secured to bar 7 and are rotatable thereby. Disc 8 is housed within the central portion of cylindrical leg 2 and disc 9 is housed within the central portion of cylindrical leg 3. As illustrated, the discs have a diameter such that discs 8 and 9 will intercept a substantial portion of material flowing downwardly from the upper end of legs 2 and 3, respectively, to the base formed by the legs and, upon rotation of the shell, will intercept a substantial portion of the particles flowing downwardly from the base of the V to the legs. These discs are employed in lieu of the small paddles present on the intensifier bar of the blender shown in U.S. Patent No. 2,677,534.

In practice, the illustrated tumbler unit is charged with friable particles of moistened feed material containing colloidal clay and the feed inlet closed. The shell is then rotated, as at 10 to 40 r.p.m., and, simultaneously, the horizontal bar is rotated at a speed within the range of about 1000 to about 4000 r.p.m. Rotation of the bar results in the rotation of the discs and, because of the oblique mounting of the discs, the discs appear to oscillate during their rotation. Alternate faces of each of the discs impact the tumbled particles during operation, establishing a condition of interflow of particles in a horizontal and vertical direction wtihin the tumbler blender. Extremely small uniformly sized spheres can be observed within the shell after a few minutes residence time. The size of the spheres increases uniformly with further residence of the charge as a result of the gradual agglomeration and compaction of existing compacted spheres as disc-intercepted tumbling is continued. In this manner, the bulk of the substantially spherical particles will have approximately the same particle size at any time. A typical operation requires 3 to 15 minutes residence of premoistened charge.

An apparatus suitable for carrying out the form of the granulating process in which the clay or mixture containing clay is moistened in the tumbler may be formed by simple modification of the rotatable intensifier bar of a commercial twin shell tumbler blender adapted for liquids-solids blending. This blender is illustrated in Bulletin No. 16–D (1960) supplied by The Patterson-Kelley Co., Inc., East Stroudsburg, Pa. Mounted on the horizontal intensifier bar of the commercial unit and rotatable therewith are two small liquid feed discs, each disc having four knife blades attached to its periphery. It has been found that this unit, as supplied, is completely unsuitable for granulating clay. Soft, poorly sized, non-spherical agglomerates are produced rather than the desired hard, spherical uniformly sized particles. In modifying the commercial unit for purposes of this invention, the small canted liquid feed discs with attached blades can be removed from the rotatable bar and replaced by larger canted discs, as illustrated in the accompanying figure. Thus, in modifying a commercial 8 quart unit, the 3-inch disc members supplied with the unit can be replaced with discs having a 6-inch diameter. Alternatively, the larger discs can be mounted adjacent to and in contact with the small spray nozzle discs after removal of all blades from the small spray nozzle discs.

While disc-intercepted tumbling in twin shell blender has been found to be eminently successful in carrying out this invention, it will be distinctly understood that the disc-intercepted tumbling can be carried out in other tumblers, such as, for example, a rotatable twin cone blender that is provided with a horizontal rotatable shaft having canted discs of sufficiently large diameter mounted thereon.

It is fully within the scope of this invention to round further the substantially spherical granules obtained by disc-intercepted tumbling either before the granules have been hardened by the drying operation or simultaneously while the granules are being dried. This result can be realized by tumbling the green granules from the disc-intercepted tumbling operation in a separate tumbling unit that is free from rotating discs (which would cause an undesired further increase in granule size). To improve the roundness or sphericity of the green granules without increasing their size, the granules can be continuously tumbled in a rotary vessel, such as, for example, a rotary drum dryer, until irregularities or angularities in the granules are deformed to the required extent. This result is brought out without chipping corners of the granules, a procedure which would lead to undesirable dust formation.

The following examples of the practice of this invention are given to contribute to a fuller understanding thereof. It will be distinctly understood that variations may be made from the specific embodiments illustrated without departing from the spirit and scope of the invention. All mesh sizes mentioned in the examples, as well as elsewhere in this application, refer to values obtained with Tyler standard screen-scale sieves.

Hard substantially spherical clay granules were successfully produced in a commercial 8 quart twin shell liquids-solids blender (Patterson-Kelley) by removing all of the peripheral blades from the two canted 3-inch liquid feed discs on the rotatable intensifier bar and inserting adjacent to, and in face to face contact with the outer face of each feed disc, a 6-inch diameter disc made of $\frac{1}{16}$-inch sheet metal and having a center cut to fit the flange of the spray nozzle. The disc was fastened on the spray nozzle by bolts.

Following are examples of the method and formulas used in producing the hard spherical granules.

(I) Calcined attapulgite granules (useful as a carrier for active agricultural ingredients). Using the twin shell liquids-solids tumble blender modified as described immediately above, the blender was charged with 3000 grams of commercial attapulgite clay calcined to a volatile matter content of about 8% and a free moisture content of about 2% (Attaclay LVM). The blender shell was rotated at 30 r.p.m. and, over a period of about three minutes, 2500 grams of water was added through the liquid feed discs while the intensifier bar was operated at 3500 r.p.m. After addition of water was completed, the rotation of shell and intensifier bar was continued for about 10 minutes. The spherical agglomerates were discharged from the blender and dried at 220° F. to constant weight, producing a product consisting of hard spherical clay granules, a substantial portion of which were 24/48 mesh.

(II) Attapulgite granules useful as contact adsorbent. The granules were produced by the same method as (I) above but attapulgite heated at 400° F. to a volatile matter content of about 17% and a free moisture content of about 8% (Attaclay X-250) was used as the charge clay.

(III) Attapulgite granules with caustic hardening agent. The granules were produced by the same method as (II) above but 3% NaOH (based on the clay weight) was dissolved in the water with which the clay is moistened.

(IV) Granular 10% Sevin insecticide product. The tumble blender was first charged with 2700 grams of Attaclay LVM and 300 grams of powdered technical grade of N-methyl-1-naphthyl carbamate, which is a contact insecticide supplied under the trade name "Sevin." With the shell rotating and the intensifier bar running at 3500 r.p.m., 2214 grams of water was added over a period of about three minutes to the powdered solids. After addition of water, the shell and intensifier bar were rotated for about 15 minutes. The resultant spheres were dried at 220° F. to remove excess moisture.

(V) Granular 20% Karmex herbicide product. This product was produced in the same manner as (IV) above. The herbicide was 3-(3,4-dichlorophenyl)-1,1-dimethyl urea, which is supplied under the trade name "Karmex." The charge to the blender was as follows:

|   | Grams |
| --- | --- |
| Karmex | 600 |
| Attaclay LVM | 2400 |
| Solution: | |
|    Water | 1968 |
|    Sodium carboxymethyl cellulose | 30 |

The foregoing description of the present invention is not to be considered as limiting since many variations may occur to those skilled in the art without departing from the scope of the claims or spirit thereof. In the claims, the terms "spheres" and "sphericules" are intended to encompass particles which deviate somewhat from true spheres, e.g., ovoid particles.

I claim:

1. A method for producing hard small uniformly sized spheres from clay which comprises:

uniformly moistening powdered clay containing colloidal clay particles with water while restricting the amount of water to a quantity which forms a multiplicity of discrete free-flowing hand-friable aggregates of clay particles, subjecting said clay thus moistened to a continuous tumbling action in a rotating vessel simultaneously while impinging at least a major quantity of said clay during its downflow against a face of at least one smooth surfaced disc free from peripheral projections and rotating in a plane oblique to its axis of rotation at a speed such that impinging particles of said clay are ejected outwardly off said disc until moist small spheres of the desired particle size have formed, and drying the resultant spheres to effect their hardening.

2. A method for producing hard small uniformly sized spheres from clay which comprises:

uniformly moistening powdered clay containing colloidal clay particles with water while restricting the amount of water to a quantity which forms a multiplicity of discrete free-flowing hand-friable aggregates of clay particles, subjecting said clay thus moistened to a continuous tumbling action in a rotating vessel simultaneously while impinging at least a major quantity of said clay during its downflow against a face of at least one smooth surfaced disc free from peripheral projection and rotating in a plane oblique to its axis of rotation at a speed within the range of about 1000 to 4000 r.p.m., whereby said clay is subjected during tumbling to intensive localized impaction of a nature such that particles of said clay gradually accumulate into compacted sphericules, continuing said tumbling and localized impaction until small moist spheres of the desired particle size have formed, and drying the resultant spheres to effect their hardening.

3. The method of claim 2 wherein said clay is attapulgite.

4. The method of claim 3 wherein said attapulgite clay is moistened to a free moisture content within the limits of about 30% to 50% by weight.

5. A method for producing hard small uniformly sized spheres from attapulgite clay which comprises:

uniformly mixing powdered attapulgite clay containing colloidal particles with water to a free moisture content within the range of about 30% to about 50% by weight, subjecting the moistened clay particles to a continuous tumbling action in a rotating vessel simultaneously while impinging substantially all of the clay during its downflow against a face of at least one smooth surfaced disc free from peripheral projections and rotating in a plane oblique to its axis of rotation at a speed of about 3500 r.p.m. until moist spherical compacted clay particles of the desired particle size are formed, and drying the resultant spheres to effect their hardening.

6. A method for producing small hard uniformly sized spherical agglomerates which comprises:

tumbling a dry mass of powdered clay containing colloidal particles in a rotating vessel, simultaneously while tumbling said mass
    (1) impinging said mass during its downflow against faces of a plurality of horizontally spaced discs free from peripheral projections and rotating about the same horizontal axis in a plane oblique to said axis at a speed within the range of about 1000 to 4000 r.p.m. and
    (2) spraying said mass with water until the quantity of water sprayed on said mass is sufficient to moisten the clay particles to an extent such that a multiplicity of small discrete pulverulent free-flowing clay aggregates is formed, continuing the tumbling and local impaction of the moistened clay after addition of water is completed until soft moist spherical clay agglomerates of the desired particle size are formed, and drying the resultant spherical agglomerates to effect their hardening.

7. The method of claim 6 in which said clay is attapulgite clay and said clay is moistened to a free moisture content within the range of 30% to 50% by weight.

8. A method for binding an insoluble powdered solid material into small hard spheres of uniform size which comprises:

mixing powdered clay containing colloidal clay particles with powdered water-insoluble particles to be bonded by said clay, moistening the resultant mixture with water while restricting the amount of water to a quantity which forms therewith a multiplicity of discrete pulverulent free-flowing aggregates of mixture, subjecting the mixture thus moistened to a continuous tumbling action in a rotating vessel simultaneously while impinging at least a major amount of said mixture during its downflow against a face of at least one smooth surfaced disc free from peripheral projections and rotating in a plane oblique to its axis of rotation at a speed such that impinging particles of said mixture are ejected outwardly off said disc, whereby said mixture is subjected during tumbling to intensive localized impaction, causing powdered particles to accumulate gradually into sphericules, continuing said tumbling and localized impaction of said mixture until a sufficient quantity of said sphericules have compacted together to form small spheres of the desired particle size, and drying the resultant spheres to effect their hardening.

9. The method of claim 8 in which said discs rotate at a speed within the range of 1000 to 4000 r.p.m.

10. The method of claim 8 wherein said clay is attapulgite.

11. The method of claim 8 wherein said attapulgite clay is moistened to a free moisture content within the limits of about 30% to 50% by weight.

12. A method for binding powdered solids with clay which comprises:

uniformly mixing dry powdered clay containing colloidal particles with powdered particles of water-insoluble material, uniformly moistening the resulting mixture with water while restricting the amount of water to a quantity which forms therewith discrete free-flowing pulverulent aggregates, subjecting the mixture thus moistened to a continuous tumbling action in a rotating vessel simultaneously while intercepting a major portion of said mixture during its downflow against a plurality of smooth surfaced baffle-free discs each rotating at high speed in a plane oblique to a common axis of rotation of said discs until moist spheres of the desired size are formed, and drying the resultant spheres to effect their hardening.

13. A method for producing hard clay bonded spherical agglomerates which comprises:

uniformly dry mixing a dry powdered clay containing colloidal particles with a powdered noncolloidal insoluble solid to be bonded by said clay, subjecting the resulting mixture to a continuous tumbling action in a rotating vessel simultaneously while
    (1) impinging a major portion of said mixture during its downflow against at least one smooth surfaced disc free from peripheral projections and rotating in a plane oblique to its axis of rotation at a speed such that impinging particles are ejected outwardly from said disc and
    (2) spraying said mixture with water until the quantity of water sprayed on said mixture is sufficient to moisten the particles of the mixture to an extent such that a mass of small discrete free-flowing pulverulent aggregates are formed, continuing the tumbling and impingement of the moistened mixture against the rotating disc after addition of water is completed until moist compacted spherical agglomerates of the desired particle size are formed, and drying the resultant spherical agglomerates to effect their hardening.

14. The method of claim 8 wherein said powdered water-insoluble particles comprise a herbicide.

15. The method of claim 8 wherein said powdered water-insoluble particles comprise an insecticide.

16. The method of claim 12 wherein said clay is attapulgite and said water-insoluble material is a herbicide.

17. The method of claim 12 wherein said clay is attapulgite and said water-insoluble material is an insecticide.

References Cited by the Examiner
UNITED STATES PATENTS

| | | | |
|---|---|---|---|
| 2,293,439 | 4/42 | Lloyd | 18—1 |
| 2,890,027 | 6/59 | Fischer | 259—16 |
| 2,915,300 | 12/59 | Fischer | 259—16 |
| 3,060,496 | 10/62 | McDowell | 18—1 |

ROBERT F. WHITE, *Primary Examiner.*

ALEXANDER H. BRODMERKEL, *Examiner.*